Nov. 2, 1971   G. NOTARI   3,616,671
ROLL FOR ROLLING MILLS
Filed Oct. 21, 1969

INVENTOR
Georges Notari
BY Pennie, Edmonds,
Morton, Taylor and Adams
ATTORNEYS

United States Patent Office 3,616,671
Patented Nov. 2, 1971

3,616,671
ROLL FOR ROLLING MILLS
Georges Notari, Monte Carlo, Monaco, assignor to
Ugine-Carbone, Paris, France
Filed Oct. 21, 1969, Ser. No. 868,164
Claims priority, application France, Oct. 22, 1968,
170,807
Int. Cl. B21b 31/08
U.S. Cl. 72—237                                    4 Claims

ABSTRACT OF THE DISCLOSURE

A rolling mill roll includes a shaft having a shoulder thereon, a profile-defining ring engaged about the shaft and against the shoulder, and quick-release means for holding the ring in place. These comprise an outer dished ring fitting with clearance over the end of the shaft and bearing against the profile ring, an inner dished ring coupled to the outer ring, and at least one pin extending radially inward from the inner dished ring for engagement with a helical thread cut on the shaft, the thread terminating in a length of zero or reverse pitch.

---

The present invention relates to rolls for rolling mills and more particularly to rolls including removable rings or sleeves which contact the work and define the shape or profile to be imparted thereto. The invention provides such a roll including means for quickly fastening and unfastening the profile-defining rings therefrom.

BRIEF DESCRIPTION OF THE DRAWINGS

The invention will be further described in terms of an exemplary embodiment thereof and by reference to the accompanying drawing wherein.

DESCRIPTION OF THE PREFERRED EMBODIMENT

Figure 1:
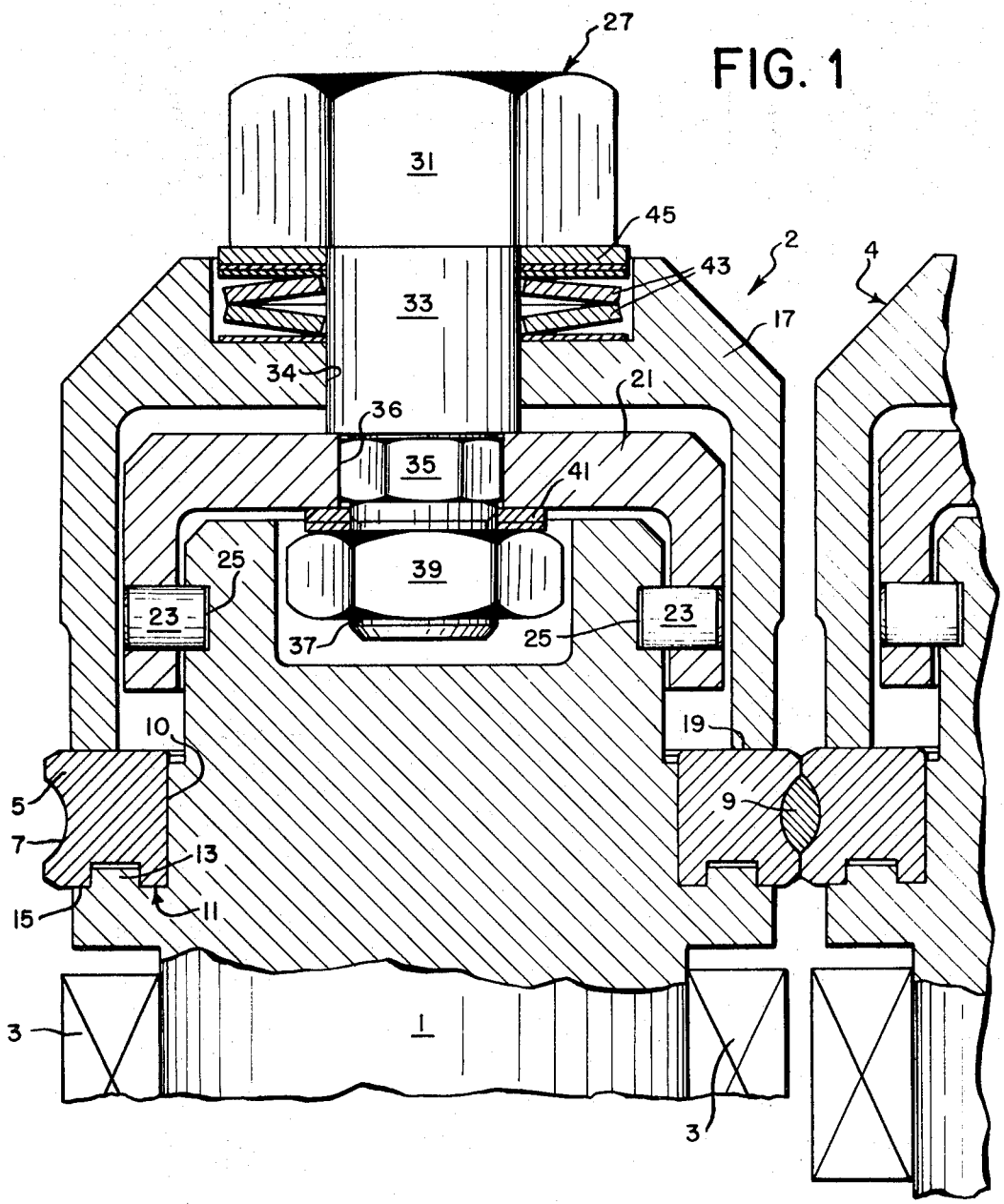
FIG. 1 is an axial sectional view through one end of a roll in accordance with the invention with a fragmentary axial sectional view through the end of the mating roll.

In FIG. 1, one roll aaccording to the invention is generally indicated at 2 and a mating roll, which may but need not be of the same construction, is generally indicated at 4. The roll 2 includes a shaft 1. This shaft is supported from a suitable frame, not shown, in bearings 3 which restrain the roll from axial as well as radial motion. The shaft supports a profile ring 5 whose radially outer surface is shaped, as indicated at 7, to define a profile to be imparted to a workpiece 9. The workpiece may for example be a bar, to be worked by one or more passes through one or more pairs of rolls of the type illustrated in the drawing, into a wire of desired cross-section.

The ring 5 is borne on a cylindrical surface 10 of the shaft 1. The axial location of the ring 5 is defined by an abutment shoulder generally indicated at 11 having extension radially of the roll, and including in the embodiment illustrated an annular rib 13 salient from a plane surface 15.

The ring 5 is held against the shoulder 11 in fixed position axially of the roll by the fastening means of the invention. These comprise an outer cup-shaped member 17 having a cylindrical end face 19, an inner cup-shaped member or spider 21 with radially inwardly directed lugs 23 engaging external threads 25 cut in the shaft 1, and a bolt assembly generally indicated at 27 by means of which the members 17 and 21 are held together.

The assembly 27 includes a bolt having a head 31 and a shank including a cylindrical portion 33, an angularly faceted portion 35 and a threaded portion 37. The cylindrical portion 33 passes through the cup 17 at a cylindrical hole 34 therein, while the faceted portion 35 passes through the spider 21 at a similarly faceted opening 36 through the latter. The bolt is thus free to turn with respect to the member 17 and vice versa, whereas the bolt and member 21 rotate together. A nut 39 is engaged on the threaded portion 37.

A washer or washers 41 may be engaged about the shank of the bolt between the nut 39 and the spider 21. Conical resilient washers 43 and flat washers 45 may be engaged about the shank of the bolt between the head 31 and the member 17.

Figure 2:
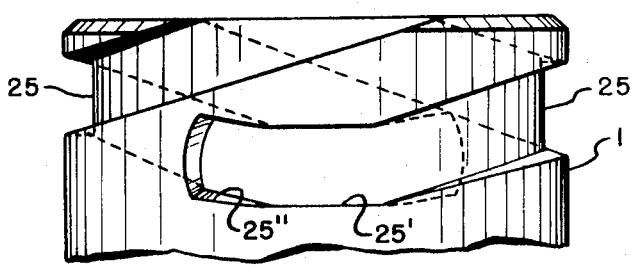
FIG. 2 is a view in side elevation of the end portion of the shaft of the roll of FIG. 1.

Rotation of the bolt head 31 and of the shank with which it is integral accordingly causes rotation of the spider 21, so that the bolt assembly and with it the cup-shaped member will be shifted axially of the roll 1 as the lugs 23 travel down the threads 25. In the example illustrated two such threads are shown interlaced one with the other, as shown in FIG. 2. The thread or threads may terminate at their axially lower end (in the figure) in a portion 25′ of zero pitch followed by a portion 25″ of reverse pitch, located so as to be reached by the lugs 23 when member 17 has drawn the ring 5 against the shoulder 11 and the washers 43 have been partially compressed.

With the construction illustrated, the profile-defining ring 5 can be quickly fastened on the roll and as quickly unfastened therefrom. Rotation of the bolt draws the spider 21 axially down on the roll and carries with it the cup-shaped member 17 until the profile ring 5 is forced into abutment with the retaining surface 11 therefor.

While the invention has been described hereinabove in terms of a presently preferred embodiment thereof, the invention is not limited thereto. Either or both of the members 17 and 21 may take the form of a complete cup-shaped member, or take instead the form of a spider, with a central hub and protruding arms which extend axially as well as radially from the hub. In the appended claims the term "dished ring" has been employed to cover both constructions. The location of the lugs 23 and threads 25 can of course be interchanged as between those two members.

I claim:
1. A rolling mill roll comprising a shaft having a shoulder formed thereon, a profile-defining ring engaged about the shaft against the shoulder, a first dished ring engageable at its periphery against the profile-defining ring, a second dished ring disposed within the first and coupled thereto, and two-part interengaging screw-type means including one part on said shaft and the other part on said second dished ring, one of said parts including at least one helical thread.

2. A rolling mill roll according to claim 1 wherein said thread includes a portion of zero pitch.

3. A rolling mill roll according to claim 1 wherein said thread includes a portion of reversed pitch.

4. A rolling mill roll according to claim 1 including a bolt passing through said first dished ring and free for rotation with respect thereto and passing through said second dished ring without freedom for rotation with respect thereto.

References Cited

UNITED STATES PATENTS

| | | | |
|---|---|---|---|
| 3,234,769 | 2/1966 | Bretschneider | 72—238 |
| 3,348,403 | 10/1967 | Bartley | 72—237 |
| 3,491,571 | 1/1970 | O'Brien | 72—237 X |

MILTON S. MEHR, Primary Examiner

U.S. Cl. X.R.

72—238; 29—129.5